US010488299B2

United States Patent
Hirose

(10) Patent No.: US 10,488,299 B2
(45) Date of Patent: Nov. 26, 2019

(54) CONTROLLER AND CONTROL METHOD FOR DOUBLY CHECKING THE STATE OF A CONTROL SHAFT

(71) Applicant: FANUC CORPORATION, Yamanashi (JP)

(72) Inventor: Noboru Hirose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 266 days.

(21) Appl. No.: 15/669,068

(22) Filed: Aug. 4, 2017

(65) Prior Publication Data

US 2018/0038771 A1 Feb. 8, 2018

(30) Foreign Application Priority Data

Aug. 5, 2016 (JP) .................................. 2016-154611

(51) Int. Cl.
*G01M 13/025* (2019.01)
(52) U.S. Cl.
CPC .................................. *G01M 13/025* (2013.01)
(58) Field of Classification Search
CPC .................................................. G01M 13/025
See application file for complete search history.

(56) References Cited

U.S. PATENT DOCUMENTS

| 3,405,557 A | 10/1968 | Sinke, Jr. |
| 5,465,624 A | 11/1995 | Tseytlin et al. |
| 5,642,297 A | 6/1997 | Brady et al. |
| 2015/0145460 A1 | 5/2015 | Tajima et al. |

FOREIGN PATENT DOCUMENTS

| CN | 104209808 A | 12/2014 |
| CN | 104589156 A | 5/2015 |
| JP | 2005-185068 A | 7/2005 |
| JP | 2011-107961 A | 6/2011 |
| JP | 2015-106936 A | 6/2015 |

*Primary Examiner* — David M. Gray
*Assistant Examiner* — Andrew V Do
(74) *Attorney, Agent, or Firm* — Hauptman Ham, LLP

(57) ABSTRACT

A controller outputs a first detection signal indicative of the position of a control shaft, and by forwardly converting a motor position signal indicative of the position of a motor through use of a motion conversion characteristic of a power transmission unit, outputs a second detection signal corresponding to the position of the control shaft. Then using the respectively output first detection signal and second detection signal, the controller doubly determines whether or not the state of the control shaft is abnormal.

18 Claims, 5 Drawing Sheets

CONTROLLER AND CONTROL METHOD FOR DOUBLY CHECKING THE STATE OF A CONTROL SHAFT

CROSS-REFERENCE TO RELATED APPLICATION

This application is based upon and claims the benefit of priority from Japanese Patent Application No. 2016-154611 filed on Aug. 5, 2016, the contents of which are incorporated herein by reference.

BACKGROUND OF THE INVENTION

Field of the Invention

The present invention relates to a controller and a control method for controlling a control shaft, and doubly checking the state of the control shaft.

Description of the Related Art

In general, a power transmission unit such as a variable gear mechanism or the like is interposed between a control shaft and a motor. Therefore, various techniques have conventionally been proposed for detecting abnormalities in the power transmission unit.

In Japanese Laid-Open Patent Publication No. 2015-106936, a motor controller is disclosed, which controls rotary driving of a motor in which rotational power is transmitted to a main shaft via a power transmission unit. To provide a brief description thereof, the motor controller includes a sensor for detecting an angle of rotation of the motor, and a sensor for detecting an angle of rotation of the main shaft. The motor controller acquires, from the sensor that detects the angle of rotation of the main shaft, a single rotation signal, which is output each time the main shaft makes one rotation. Further, the motor controller calculates a rotational velocity of the main shaft from the angle of rotation of the main shaft, and a rotational velocity of the motor from the angle of rotation of the motor. The motor controller determines that an abnormality has occurred in the power transmission unit, if an amount of change in the angle of rotation of the motor, which is acquired from acquisition of the single rotation signal until acquisition of the next single rotation signal, falls outside of a first range, or if a difference between the rotational velocity of the motor and the rotational velocity of the main shaft falls outside of a second range.

SUMMARY OF THE INVENTION

However, in the case that an abnormality occurs in the sensor itself that detects the angle of rotation, etc., of the main shaft, it becomes impossible to accurately determine if an abnormality has occurred in the power transmission unit. In order to determine whether the sensor is normal or abnormal, it is possible to handle this issue by doubly checking the angle of rotation of the main shaft, by providing two sensors that detect the angle of rotation of the main shaft. In other words, in the case that the detection results of the two sensors differ from each other, it can be determined that an abnormality has occurred in the sensor. However, although it is possible to determine whether or not there is an abnormality in the sensor by providing two sensors, in this case, another sensor must be provided only for this purpose, which increases costs.

The present invention has been devised in order to solve the aforementioned problem, and has the object of providing a controller and a control method for doubly checking the state of a control shaft, and determining whether or not there is an abnormality, without separately providing a sensor for detecting the position of the control shaft.

A controller according to a first aspect of the present invention is a controller configured to doubly check a state of a control shaft by applying motive power to the control shaft of a power transmission unit having an irregular speed characteristic or a constant gear ratio, comprising a motor configured to apply motive power to the control shaft, a position detecting unit configured to detect a position of the control shaft, and output a first detection signal indicative of the detected position, a motor position detecting unit configured to detect a position of the motor, and output a motor position signal indicative of the detected position, a position converting unit configured to output a second detection signal corresponding to the position of the control shaft, by forwardly converting the motor position signal output by the motor position detecting unit, using a motion conversion characteristic of the power transmission unit, and an abnormality determining unit configured to doubly determine whether or not the state of the control shaft is abnormal, using the first detection signal output from the position detecting unit, and the second detection signal output from the position converting unit.

In accordance with this configuration, it is possible to acquire the second detection signal, which is used for determining the validity of the first detection signal, without newly adding another detector (sensor). Stated otherwise, it is possible to doubly check the state of the control shaft, without separately providing a sensor for detecting the position of the control shaft. Further, while simplifying the device configuration, the present invention can be applied in a general purpose sense to various types of power transmission units.

In the controller according to the first aspect of the present invention, the abnormality determining unit may be configured to determine whether or not each of a first position of the control shaft on a basis of the first detection signal, and a second position of the control shaft on a basis of the second detection signal lies within a predetermined normal range. In accordance with this feature, it can be monitored in a duplicate manner whether or not the position of the control shaft lies within a normal range. Further, at least one of the position detecting unit, the motor position detecting unit, and the power transmission unit may be determined to be abnormal, in the event that only one of the first position and the second position is not within the normal range.

In the controller according to the first aspect of the present invention, the abnormality determining unit may be configured to calculate a velocity of the control shaft from each of the first detection signal and the second detection signal, and may be configured to determine whether or not each of a first velocity calculated on a basis of the first detection signal, and a second velocity calculated on a basis of the second detection signal lies within a predetermined normal range. In accordance with this feature, it can be monitored in a duplicate manner whether or not the velocity of the control shaft lies within a normal range. Further, at least one of the position detecting unit, the motor position detecting unit, and the power transmission unit may be determined to be abnormal, in the event that only one of the first velocity and the second velocity is not within the normal range.

In the controller according to the first aspect of the present invention, the abnormality determining unit may be configured to calculate an acceleration of the control shaft from each of the first detection signal and the second detection signal, and may be configured to determine whether or not each of a first acceleration calculated on a basis of the first detection signal, and a second acceleration calculated on a basis of the second detection signal lies within a predetermined normal range. In accordance with this feature, it can be monitored in a duplicate manner whether or not the acceleration of the control shaft lies within a normal range. Further, at least one of the position detecting unit, the motor position detecting unit, and the power transmission unit may be determined to be abnormal, in the event that only one of the first acceleration and the second acceleration is not within the normal range.

In the controller according to the first aspect of the present invention, the abnormality determining unit may calculate a positional deviation of the control shaft with respect to a command position of the control shaft from each of the first detection signal and the second detection signal, and may be configured to determine whether or not each of a first positional deviation of the control shaft calculated on a basis of the first detection signal, and a second positional deviation of the control shaft calculated on a basis of the second detection signal lies within a predetermined normal range. In accordance with this feature, it can be monitored in a duplicate manner whether or not the positional deviation of the control shaft lies within a normal range. Further, at least one of the position detecting unit, the motor position detecting unit, and the power transmission unit may be determined to be abnormal, in the event that only one of the first positional deviation and the second positional deviation is not within the normal range.

In the controller according to the first aspect of the present invention, the position converting unit may output the second detection signal using the motion conversion characteristic specified by a table or a function. In accordance with this feature, the second detection signal indicative of the position of the control shaft can be generated precisely from the motor position signal, and the state of the control shaft can be doubly checked.

In the controller according to the first aspect of the present invention, there may further be provided two computation units, wherein each of the two computation units includes the position converting unit and the abnormality determining unit, and at least one of each of the two computation units may determine that at least one of the two computation units is abnormal, in an event that judgment results of the abnormality determining units of each of the two computation units do not coincide with each other. In accordance with this feature, it can be determined whether or not the computation unit on the side where an abnormality is determined is normal. Consequently, the reliability of the controller in determining abnormalities is improved.

A control method according to a second aspect of the present invention is a control method in which a motor is used to apply motive power to a control shaft of a power transmission unit having an irregular speed characteristic or a constant gear ratio, comprising a first outputting step in which a position detecting unit detects a position of the control shaft, and outputs a first detection signal indicative of the detected position, a second outputting step in which a motor position detecting unit detects a position of the motor, and outputs a motor position signal indicative of the detected position, a converting step of outputting a second detection signal corresponding to the position of the control shaft, by forwardly converting the output motor position signal, using a motion conversion characteristic of the power transmission unit, and an abnormality determining step of doubly determining whether or not a state of the control shaft is abnormal, using the output first detection signal and the output second detection signal.

In accordance with this configuration, it is possible to acquire the second detection signal, which is used for determining the validity of the first detection signal, without newly adding another detector (sensor). Stated otherwise, it is possible to doubly check the state of the control shaft, without separately providing a sensor for detecting the position of the control shaft. Further, while simplifying the device configuration, the present invention can be applied in a general purpose sense to various types of power transmission units.

In the control method according to the second aspect of the present invention, the abnormality determining step may determine whether or not each of a first position of the control shaft on a basis of the first detection signal, and a second position of the control shaft on a basis of the second detection signal lies within a predetermined normal range. In accordance with this feature, it can be monitored in a duplicate manner whether or not the position of the control shaft lies within a normal range.

In the control method according to the second aspect of the present invention, the abnormality determining step may calculate a velocity of the control shaft from each of the first detection signal and the second detection signal, and may determine whether or not each of a first velocity calculated on a basis of the first detection signal, and a second velocity calculated on a basis of the second detection signal lies within a predetermined normal range. In accordance with this feature, it can be monitored in a duplicate manner whether or not the velocity of the control shaft lies within a normal range.

In the control method according to the second aspect of the present invention, the abnormality determining step may calculate an acceleration of the control shaft from each of the first detection signal and the second detection signal, and may determine whether or not each of a first acceleration calculated on a basis of the first detection signal, and a second acceleration calculated on a basis of the second detection signal lies within a predetermined normal range. In accordance with this feature, it can be monitored in a duplicate manner whether or not the acceleration of the control shaft lies within a normal range.

In the control method according to the second aspect of the present invention, the abnormality determining step may calculate a positional deviation of the control shaft with respect to a command position of the control shaft from each of the first detection signal and the second detection signal, and may determine whether or not each of a first positional deviation of the control shaft calculated on a basis of the first detection signal, and a second positional deviation of the control shaft calculated on a basis of the second detection signal lies within a predetermined normal range. In accordance with this feature, it can be monitored in a duplicate manner whether or not the positional deviation of the control shaft lies within a normal range.

In the control method according to the second aspect of the present invention, the converting step may output the second detection signal using the motion conversion characteristic specified by a table or a function. In accordance with this feature, the second detection signal indicative of the position of the control shaft can be generated precisely from the motor position signal, and the state of the control shaft can be doubly checked.

In the control method according to the second aspect of the present invention, the converting step and the abnormality determining step are executed respectively by two computation units, and there may further be included a second abnormality determining step of determining that at least one from among the two computation units is abnormal, in an event that judgment results of the abnormality determining steps executed by each of the two computation units do not coincide with each other. In accordance with this feature, it can be determined whether or not the computation unit on the side where an abnormality is determined is normal. Consequently, the reliability of the controller in determining abnormalities is improved.

According to the present invention, it is possible to acquire the second detection signal, which is used for determining the validity of the first detection signal, without newly adding another detector (sensor). Stated otherwise, it is possible to doubly check the state of the control shaft, without separately providing a sensor for detecting the position of the control shaft. Further, while simplifying the device configuration, the present invention can be applied in a general purpose sense to various types of power transmission units.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a controller according to the present invention, in relation to a control method implemented thereby, will be described below with reference to the accompanying drawings.

[First Embodiment]

Initially, a controller 10 according to a first embodiment will be described with reference to FIGS. 1 to 4.

<Configuration of Controller 10>

Figure 1:
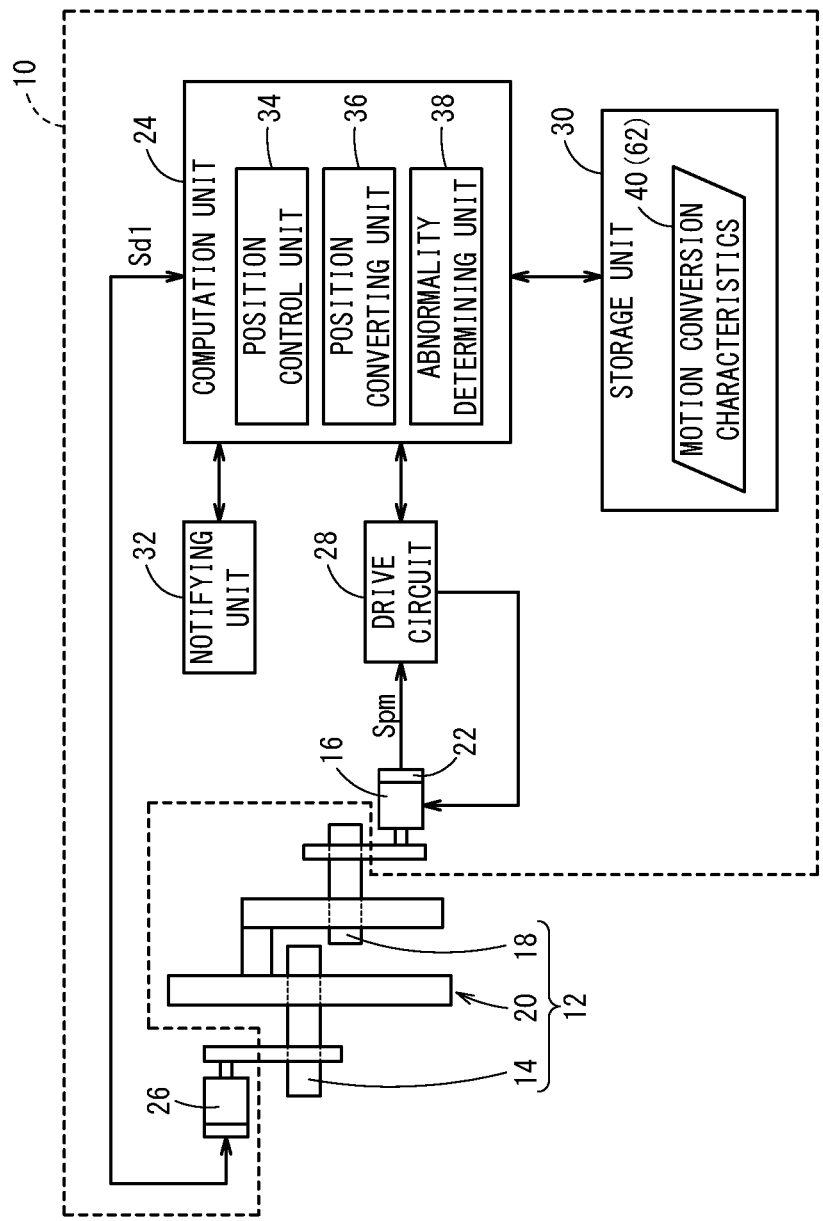
FIG. 1 is a block diagram of a controller according to a first embodiment of the present invention.

FIG. 1 is a block diagram of a controller 10 according to a first embodiment of the present invention. The controller 10 is a control device that controls the position of a control shaft 14 of a power transmission unit 12 using a motor 16 (in this case, a servo motor). In addition to the above-described control shaft 14, the power transmission unit 12 is equipped with a main shaft 18, which is capable of rotating integrally with the motor 16, and a transmission unit 20 that transmits rotational power of the motor 16 (hereinafter referred to as motive power) to the control shaft 14 via the main shaft 18.

The controller 10 is, for example, a numerical controller that comprehensively controls one or more machine tools (not shown). In the case that the machine tool is a press machine, the power transmission unit 12 makes up part of a slide drive mechanism. At this time, a ram (not shown) that undergoes reciprocating rectilinear motion is connected to the control shaft 14.

In addition to the motor 16, the controller 10 is constituted to include a pulse coder (motor position detecting unit) 22, a computation unit 24, a rotary encoder (position detecting unit) 26, a drive circuit 28, a storage unit 30, and a notifying unit 32.

The pulse coder 22 is a sensor for detecting a rotational position (hereinafter referred to as a position) of the motor 16, and is attached to the motor 16. The pulse coder 22 outputs to the drive circuit 28 a signal Spm (hereinafter referred to as a motor position signal) indicative of the detected position. The drive circuit 28 is a driver for rotating (driving) the motor 16, and drives the motor 16 under the control of the computation unit 24. The drive circuit 28 drives the motor 16 in such a manner that the rotational position (hereinafter referred to as a position) of the control shaft 14 becomes a command value (a command position of the control shaft 14) as commanded by a later-described position control unit 34 of the computation unit 24. The rotary encoder 26 is attached to the control shaft 14, and is a sensor for detecting the position of the control shaft 14. The rotary encoder 26 outputs to the computation unit 24 a signal Sd1 (hereinafter referred to as a first detection signal) indicative of the detected position.

The computation unit 24 is constituted by a processor of a CPU (Central Processing Unit) or an MPU (Micro Processing Unit). The processor functions as the computation unit 24 of the present first embodiment by reading and executing a basic program stored in the storage unit 30. The computation unit 24 includes the position control unit 34 that controls the position of the control shaft 14, a position converting unit 36 that converts the position of the motor 16 into a position of the control shaft 14, and an abnormality determining unit 38 that determines whether the control shaft 14 is normal or abnormal.

The storage unit 30 is constituted from at least one of a volatile or nonvolatile memory device. The memory device, for example, is constituted by a ROM (Read Only Memory), a RAM (Random Access Memory), a PROM (Programmable ROM), an EEPROM (Electrically Erasable Programmable ROM), and a flash memory, or the like. In the present illustrated example, a motion conversion characteristic 40 (or 62) of the power transmission unit 12, and the basic program, etc., are stored in the storage unit 30.

The notifying unit 32 is made up from an output device including a display or a speaker, for example, and in response to an output instruction from the computation unit 24, outputs visible images or sounds to an operator.

Figure 2:
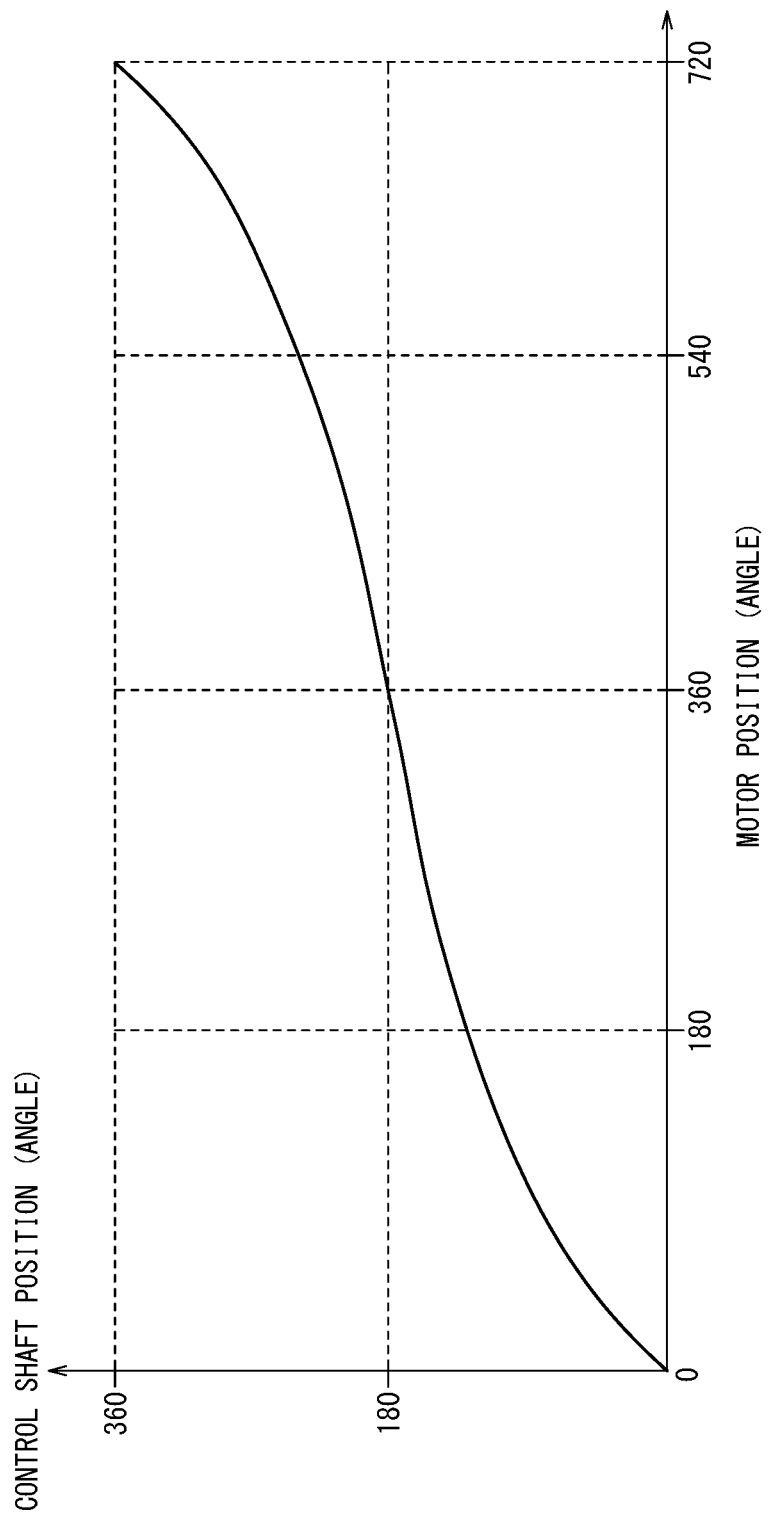
FIG. 2 is a diagram showing an example of a motion conversion characteristic in a power transmission unit shown in FIG. 1.

FIG. 2 is a diagram showing an example of a motion conversion characteristic in the power transmission unit 12 shown in FIG. 1. The horizontal axis of the graph shows the position (in units of degrees) of the motor 16, and the vertical axis of the graph shows the position (in units of degrees) of the control shaft 14. The motion conversion characteristic 40 shown in FIG. 2 is a conversion characteristic for converting the position of the motor 16 into a position of the control shaft 14. The units of position are not limited to angles (as indicated, for example, by degrees), but may be other units (e.g., mm) that are capable of specifying the position.

As can be understood from FIG. 2, since the motion conversion characteristic 40 is non-linear, the power transmission unit 12 is a so-called irregular speed change mechanism (variable gear mechanism) having an irregular speed characteristic. More specifically, the ratio (gear ratio) between the velocity of the motor 16 and the velocity of the control shaft 14 fluctuates according to the position of the motor 16. Various mechanical structures including a crank mechanism, a knuckle joint mechanism, a link mechanism (more specifically, a Cleveland mechanism, a Whitworth mechanism, or the like) may be adopted as the power transmission unit 12 having an irregular speed characteristic. Moreover, the power transmission unit 12 may have a constant gear ratio. In the case that a power transmission unit 12 having a constant gear ratio is used, the gear ratio may be other than 1:1 (for example, 2:1, 3:1, or the like).

Figure 3:
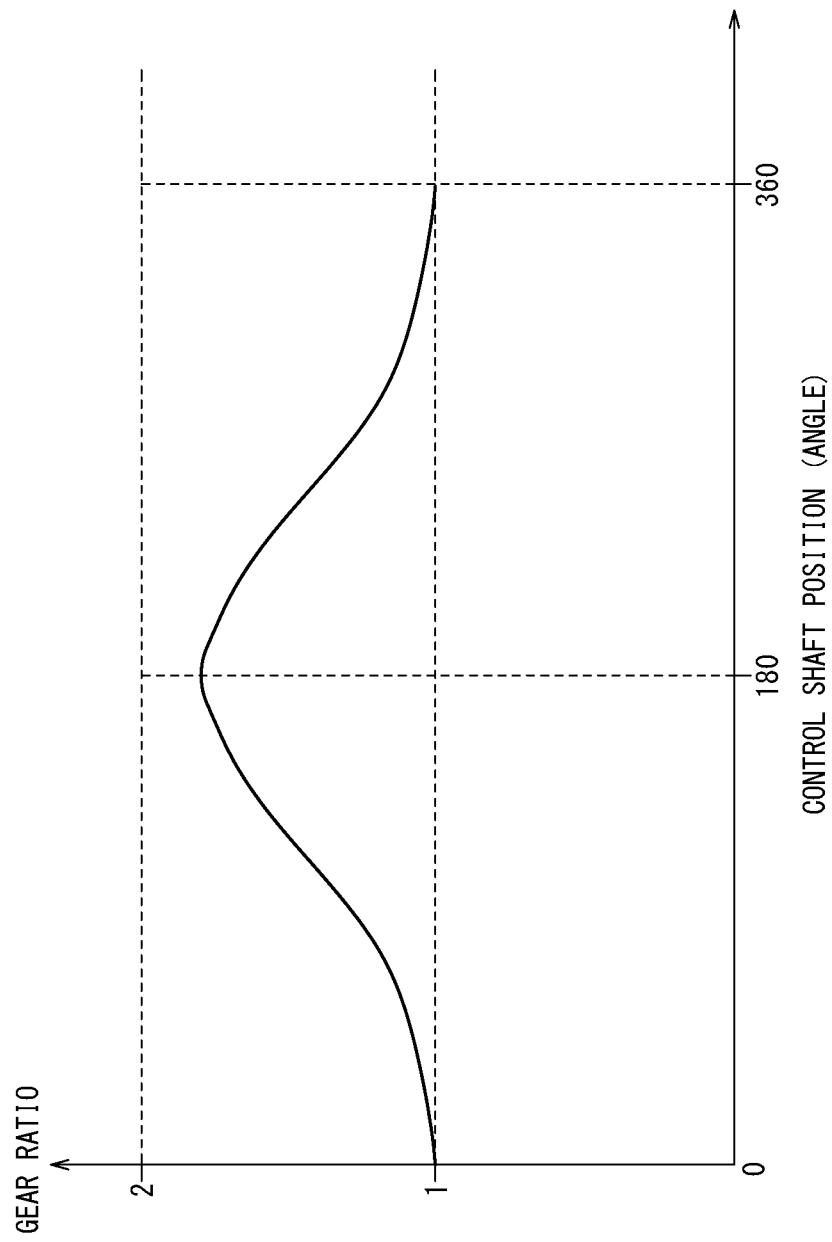
FIG. 3 is a diagram showing another example of a motion conversion characteristic in the power transmission unit shown in FIG. 1.

FIG. 3 is a diagram showing another example of a motion conversion characteristic in the power transmission unit 12 shown in FIG. 1. The horizontal axis of the graph shows the position (in units of degrees) of the control shaft 14, and the vertical axis of the graph shows the gear ratio (units: none). The motion conversion characteristic 62 shown in FIG. 3 is a conversion characteristic for converting the position of the motor 16 into a position of the control shaft 14, and in this manner, is substantially the same as the motion conversion characteristic 40 shown in FIG. 2.

<Operations of the Controller 10>

The controller 10 according to the first embodiment is configured in the manner described above. Next, operations of the controller 10 will be described in detail with reference to the flowchart of FIG. 4. According to the first embodiment, the state of the control shaft 14 is doubly checked using the detection results of the pulse coder 22 and the rotary encoder 26, and it is determined whether or not the rotary encoder 26 or the power transmission unit 12 is abnormal.

Figure 4:
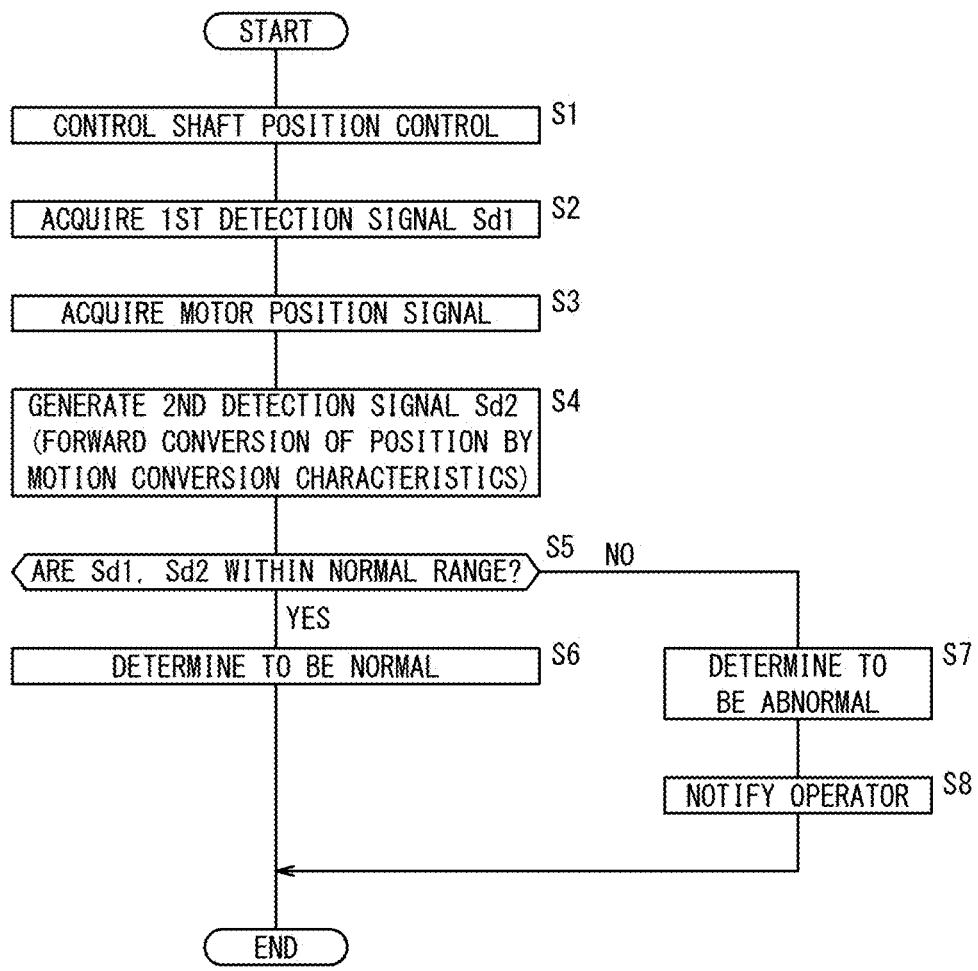
FIG. 4 is a flowchart for describing operations of the controller shown in FIG. 1.

In step S1 of FIG. 4, the position control unit 34 drives the motor 16 so that the position of the control shaft 14 arrives at a command value. The position control unit 34 acquires the command value by analyzing a program for controlling the control shaft 14, which is stored in the storage unit 30.

Next, in step S2, the computation unit 24 supplies a control signal to the rotary encoder 26 instructing that a measurement operation be performed. In response to the instruction from the computation unit 24, the rotary encoder 26 outputs a first detection signal Sd1 indicative of the position of the control shaft 14 at a predetermined measurement timing. Thereafter, after having acquired the first detection signal Sd1 from the rotary encoder 26, the computation unit 24 stores the first detection signal Sd1 in the storage unit 30.

Next, in step S3, the computation unit 24 supplies a control signal to the pulse coder 22 instructing that a measurement operation be performed. In response to the instruction from the computation unit 24, the pulse coder 22 outputs a motor position signal Spm indicative of the position of the motor 16 at a predetermined measurement timing. Thereafter, after having acquired the motor position signal Spm from the pulse coder 22 through the drive circuit 28, the computation unit 24 stores the motor position signal Spm in the storage unit 30.

In step S4, using the motion conversion characteristic 40 (or 62) read out from the storage unit 30, the position converting unit 36 of the computation unit 24 carries out forward conversion of the motor position signal Spm that was acquired in step S3, whereby a second detection signal Sd2 corresponding to the position of the control shaft 14 is generated. In this instance, the motion conversion characteristics 40, 62 are specified, for example, by a table or a function. For example, in the case that the motion conversion characteristic 40 shown in FIG. 2 is specified by a table, a relationship between the position of the motor 16 and the position of the control shaft 14 is stored in the storage unit 30 in the form of a one-to-one correspondence, and in the case of being specified by a function, a function indicative of the motion conversion characteristic 40 is stored in the storage unit 30. Consequently, the state of the control shaft 14 can be doubly-checked (checked in a duplicative manner).

In the event that there are no errors in mounting of the pulse coder 22 and the rotary encoder 26, and no errors or variations in mounting of other components of the power transmission unit 12 (i.e., in the case of an ideal state), and thus if the power transmission unit 12 and the rotary encoder 26 are normal, the first detection signal Sd1 acquired in step S2 coincides or matches with the second detection signal Sd2. It should be noted that, according to the first embodiment, the pulse coder 22 is treated as being in a normal state at all times.

In step S5, the abnormality determining unit 38 of the computation unit 24 carries out a determination as to whether or not the position (first position) of the control shaft 14 on the basis of the first detection signal Sd1 acquired in step S2, and the position (second position) of the control shaft 14 on the basis of the second detection signal Sd2 generated in step S4 lie within a normal range.

In step S5, when the abnormality determining unit 38 determines that the position of the control shaft 14 on the basis of the first detection signal Sd1 and the position of the control shaft 14 on the basis of the second detection signal Sd2 both lie within a normal range, the control shaft 14 is determined to be normal (step S6), and the current operation is brought to an end. On the other hand, in step S5, when the abnormality determining unit 38 determines that at least one of the position of the control shaft 14 on the basis of the first detection signal Sd1 and the position of the control shaft 14 on the basis of the second detection signal Sd2 does not lie within the normal range, at least one of the rotary encoder 26 and the power transmission unit 12 is determined to be abnormal (step S7), whereupon the routine proceeds to step S8. The normal range is a predetermined value (defined by parameters, etc.), and information indicative of such a predetermined range is stored, for example, in a storage medium such as the storage unit 30 or the like. Further, in the case that the control shaft 14 is abnormal, the abnormality determining unit 38 may isolate and determine separately whether at least one of the rotary encoder 26 and the power transmission unit 12 is abnormal.

In step S8, the computation unit 24 supplies a control signal to the notifying unit 32 instructing that a notification operation be performed. Consequently, the notifying unit 32 displays a warning screen or outputs an alarm sound in response to the instruction from the computation unit 24, and informs the operator that an abnormality has occurred.

In step S5 of the flowchart of FIG. 4, whether the state is normal or abnormal is determined using positions based on the first detection signal Sd1 and the second detection signal Sd2. However, whether the state is normal or abnormal may also be determined from values that are calculated from the first detection signal Sd1 and the second detection signal Sd2. Modifications (first through third modifications) of such a determination will be described in detail below, however, whether the state is normal or abnormal may also be determined by other methods. Stated otherwise, any method may be used, so long as a determination can be made as to whether the state is normal or abnormal using the first detection signal Sd1 and the second detection signal Sd2.

<First Modification>

According to a first modification, a velocity of the control shaft 14 is used. Assuming that the position of the control shaft 14 detected at a previous time by the rotary encoder 26 is defined by POS1_OLD (time: t), and the position of the control shaft 14 detected at the current time by the rotary encoder 26 is defined by POS1_NEW (time: t+Δt), the velocity (first velocity) V1 of the control shaft 14 calculated using the first detection signal Sd1 is determined by the following equation (1). The position of the control shaft 14 is specified based on the first detection signal Sd1.

$$V1=(POS1\_NEW-POS1\_OLD)/\Delta t \tag{1}$$

On the other hand, assuming that the position of the motor 16 detected at a previous time by the pulse coder 22 is defined by POS2_OLD (time: t), and the position of the motor 16 detected at the current time by the pulse coder 22 is defined by POS2_NEW (time: t+Δt), the velocity (second velocity) V2 of the control shaft 14, which is calculated using the second detection signal Sd2, is determined by the following equation (2). In this instance, F( ) is a functional operator indicative of the motion conversion characteristic 40 (forward conversion) of the power transmission unit 12. The position of the motor 16 is specified on the basis of the motor position signal Spm.

$$V2=\{F(POS2\_NEW)-F(POS2\_OLD)\}/\Delta t \tag{2}$$

In step S5 of FIG. 4, the abnormality determining unit 38 initially calculates the velocities V1, V2 using equation (1) and equation (2). In addition, the abnormality determining unit 38 determines whether the velocities V1, V2 both lie within a normal range. According to the first modification, the normal range is set to be less than or equal to a threshold value (upper limit value) Verr. Accordingly, if V1≤Verr and V2≤Verr, the abnormality determining unit 38 determines that the control shaft 14 is normal. Further, if the condition that V1≤Verr and V2≤Verr is not satisfied, the abnormality determining unit 38 determines that the control shaft 14 is abnormal. In this instance, Verr is an arbitrary value, and corresponds to an upper limit value of an allowable velocity error.

<Second Modification>

According to a second modification, a positional deviation of the control shaft 14 is used. In this instance, the term "positional deviation" implies an amount of divergence between a position and a command value therefor by the position control unit 34. Assuming that the most recent command value to the control shaft 14 (a command position for the control shaft 14) is defined by POS1_CMD, and the actual position of the control shaft 14 in response to the command value is defined by POS1_TMP, the positional deviation (first positional deviation) DP1 of the control shaft 14 is determined by the following equation (3). The term POS1_TMP is the position of the control shaft 14 as detected by the rotary encoder 26, and is specified on the basis of the first detection signal Sd1, which is output from the rotary encoder 26.

$$DP1=POS1\_TMP-POS1\_CMD \tag{3}$$

On the other hand, assuming that the actual position of the motor 16 detected by the pulse coder 22 is POS2_TMP, the positional deviation (second positional deviation) DP2 of the control shaft 14 is expressed by the following equation (4). The position of the motor 16 is specified on the basis of the motor position signal Spm.

$$DP2=F(POS2\_TMP)-POS1\_CMD \tag{4}$$

The abnormality determining unit 38 initially calculates the positional deviations DP1, DP2 using equation (3) and equation (4) in step S5 shown in FIG. 4. In addition, the abnormality determining unit 38 doubly determines whether the positional deviations DP1, DP2 both lie within a normal range. According to the second modification, the normal range is set to be less than or equal to a threshold value (upper limit value) DPerr. Accordingly, if DP1≤DPerr and DP2≤DPerr, the abnormality determining unit 38 determines that the control shaft 14 is normal. Further, if the condition that DP1≤DPerr and DP2≤DPerr is not satisfied, the abnormality determining unit 38 determines that the control shaft 14 is abnormal. In this instance, DPerr is an arbitrary value, and corresponds to an upper limit value of an allowable positional deviation error.

<Third Modification>

According to a third modification, an acceleration of the control shaft 14 is used. Using the technique of the above-described first modification, and assuming that the velocity V1 of the control shaft 14 detected at a previous time is defined by V1_OLD (time: t), and the velocity V1 the control shaft 14 detected at the current time is defined by V1_NEW (time: t+Δt), the acceleration (first acceleration) A1 of the control shaft 14 calculated on the basis of the first detection signal Sd1 is determined by the following equation (5).

$$A1=(V1\_NEW-V1\_OLD)/\Delta t \tag{5}$$

On the other hand, using the technique of the above-described first modification, assuming that the velocity V2 of the control shaft 14 detected at a previous time is defined by V2_OLD (time: t), and the velocity V2 of the control shaft 14 detected at the current time is defined by V2_NEW (time: t+Δt), the acceleration (second acceleration) A2 of the control shaft 14, which is calculated on the basis of the second detection signal Sd2 (motor position signal Spm), is determined by the following equation (6).

$$A2=(V2\_NEW-V2\_OLD)/\Delta t \tag{6}$$

In step S5 of FIG. 4, the abnormality determining unit 38 initially calculates the accelerations A1, A2 using equation (1), equation (2), equation (5), and equation (6). In addition, the abnormality determining unit 38 doubly determines whether the accelerations A1, A2 both lie within a normal range. According to the third modification, the normal range is set to be less than or equal to a threshold value (upper limit value) Aerr. Accordingly, if A1≤Aerr and A2≤Aerr, the abnormality determining unit 38 determines that the control shaft 14 is normal. Further, if the condition that A1≤Aerr and A2≤Aerr is not satisfied, the abnormality determining unit 38 determines that the control shaft 14 is abnormal. In this instance, Aerr is an arbitrary value, and corresponds to an upper limit value of an allowable acceleration error.

Although in the above description, the power transmission unit 12 was designated as being a power transmission unit having an irregular speed characteristic, the power transmission unit 12 may be a power transmission unit having a constant gear ratio. In this case as well, the storage unit 30 stores a motion conversion characteristic of such a power transmission unit 12 in which the gear ratio thereof is constant.

[Modifications]

The above-described first embodiment may be modified in the following ways.

(Modification 1) In Modification 1, the power transmission unit 12 converts the motive power in the direction of rotation of the motor 16 into a motive power in a straight direction (axial direction), and transmits the power to the control shaft 14. Accordingly, the control shaft 14 moves linearly along the axial direction. In this case, instead of the rotary encoder 26, a position detecting unit such as a displacement sensor or the like, which is capable of detecting a position in the axial direction of the control shaft 14, is provided. The detection signal detected by the position detecting unit becomes the first detection signal Sd1. Further, in Modification 1, the storage unit 30 stores a motion conversion characteristic of the power transmission unit 12 that converts the position in the direction of rotation of the motor 16 into a position in the axial direction of the control shaft 14. Even if the control shaft 14 of the power transmission unit 12 moves along an axial direction, similar to the first embodiment, it is possible to doubly determine whether or not the control shaft 14 is abnormal. Moreover, the power transmission unit 12 of Modification 1 may be a so-called irregular speed change mechanism having an irregular speed characteristic, or may be a transmission mechanism having a constant gear ratio.

(Modification 2) In the first embodiment described above, for facilitating understanding, the pulse coder 22 was described as being normal. However, there is also a concern that the pulse coder 22 may fail. Accordingly, in the case that the respective positions based on the first detection signal Sd1 and the second detection signal Sd2 do not fall within the normal range, in addition to determining that the control shaft 14 is abnormal, the abnormality determining unit 38 of the controller 10 may also isolate and determine separately whether at least one of the pulse coder 22, the rotary encoder 26, and the power transmission unit 12 is abnormal. Further, the abnormality determining unit 38 of the controller 10 may also determine the control shaft 14 to be abnormal, in the event that the velocities V1, V2, the accelerations A1, A2, or the positional deviations DP1, DP2, which are calculated respectively from the first detection signal Sd1 and the second detection signal Sd2, do not fall within correct ranges therefor.

<Effects of First Embodiment (Including Modifications)>

As has been described above, the controller 10 is equipped with [1] the motor 16 which applies motive power to the control shaft 14 of the power transmission unit 12 having an irregular speed characteristic or a constant gear ratio, [2] the rotary encoder 26 that detects the position of the control shaft 14, and outputs the first detection signal Sd1 indicative of the detected position, [3] the pulse coder 22 that detects the position of the motor 16, and outputs the motor position signal Spm indicative of the detected position, [4] the position converting unit 36 that outputs the second detection signal Sd2 corresponding to the position of the control shaft 14, by forwardly converting the output motor position signal Spm using the motion conversion characteristic 40 of the power transmission unit 12, and [5] the abnormality determining unit 38 that doubly determines whether or not the control shaft 14 is abnormal, using the output first detection signal Sd1 and the output second detection signal Sd2.

Further, the control method in which the controller 10 is used comprises [1] the first outputting step (S2) in which the rotary encoder 26 detects the position of the control shaft 14, and outputs the first detection signal Sd1 indicative of the detected position, [2] the second outputting step (S3) in which the pulse coder 22 detects the position of the motor 16, and outputs the motor position signal Spm indicative of the detected position, [3] the converting step (S4) of outputting the second detection signal Sd2 corresponding to the position of the control shaft 14, by forwardly converting the output motor position signal Spm using the motion conversion characteristic 40 of the power transmission unit 12, and [4] the abnormality determining step (S5 to S7) of doubly determining whether or not the control shaft 14 is abnormal, using the output first detection signal Sd1 and the output second detection signal Sd2.

In this manner, the motor position signal Spm from the pulse coder 22 is forwardly converted using the motion conversion characteristic 40 of the power transmission unit 12, and the second detection signal Sd2 corresponding to the position of the control shaft 14 is output. Consequently, it is possible to acquire a reference value (i.e., the second detection signal Sd2), which is used for determining the validity of the first detection signal Sd1, without newly adding another detector (sensor). Stated otherwise, it is possible to doubly check the state of the control shaft 14, without separately providing a sensor for detecting the position of the control shaft 14. Further, while simplifying the device configuration, the present invention can be applied in a general purpose sense to various types of power transmission units 12.

The abnormality determining unit 38 may determine whether or not each of a first position of the control shaft 14 on the basis of the first detection signal Sd1, and a second position of the control shaft 14 on the basis of the second detection signal Sd2 lie within a predetermined normal range. In accordance with this feature, it can be monitored in a duplicate manner whether or not the position of the control shaft 14 lies within a normal range. In addition, the abnormality determining unit 38 may determine that at least one of the pulse coder 22, the rotary encoder 26, and the power transmission unit 12 is abnormal, in the event that only one of the first position and the second position is not within the normal range. Consequently, it is possible to easily and accurately determine an abnormality of the pulse coder 22, the rotary encoder 26, or the power transmission unit 12.

The abnormality determining unit 38 may calculate the velocity of the control shaft 14 from each of the first detection signal Sd1 and the second detection signal Sd2, and may determine whether or not each of a first velocity V1 calculated on the basis of the first detection signal Sd1, and a second velocity V2 calculated on the basis of the second detection signal Sd2 lie within a predetermined normal range. In accordance with this feature, it can be monitored in a duplicate manner whether or not the velocity of the control shaft 14 lies within a normal range. In addition, the abnormality determining unit 38 may determine that at least one of the pulse coder 22, the rotary encoder 26, and the power transmission unit 12 is abnormal, in the event that only one of the first velocity V1 and the second velocity V2 is not within the normal range. Consequently, it is possible to easily and accurately determine an abnormality of the pulse coder 22, the rotary encoder 26, or the power transmission unit 12.

The abnormality determining unit 38 may calculate the acceleration of the control shaft 14 from each of the first detection signal Sd1 and the second detection signal Sd2, and may determine whether or not each of a first acceleration A1 calculated on the basis of the first detection signal Sd1, and a second acceleration A2 calculated on the basis of the second detection signal Sd2 lie within a predetermined normal range. In accordance with this feature, it can be monitored in a duplicate manner whether or not the acceleration of the control shaft 14 lies within a normal range. In addition, the abnormality determining unit 38 may determine that at least one of the pulse coder 22, the rotary encoder 26, and the power transmission unit 12 is abnormal, in the event that only one of the first acceleration A1 and the second acceleration A2 is not within the normal range. Consequently, it is possible to easily and accurately determine an abnormality of the pulse coder 22, the rotary encoder 26, or the power transmission unit 12.

The abnormality determining unit 38 may calculate a positional deviation of the control shaft 14 with respect to a command position of the control shaft 14 from each of the first detection signal Sd1 and the second detection signal Sd2, and may determine whether or not each of a first positional deviation DP1 of the control shaft 14 calculated on the basis of the first detection signal Sd1, and a second positional deviation DP2 of the control shaft 14 calculated on the basis of the second detection signal Sd2 lie within a predetermined normal range. In accordance with this feature, it can be monitored in a duplicate manner whether or not the positional deviation of the control shaft 14 lies within a normal range. In addition, the abnormality determining unit 38 may determine that at least one of the pulse coder 22, the rotary encoder 26, and the power transmission unit 12 is abnormal, in the event that only one of the first positional deviation DP1 and the second positional deviation DP2 is not within the normal range. Consequently, it is possible to easily and accurately determine an abnormality of the pulse coder 22, the rotary encoder 26, or the power transmission unit 12.

The position converting unit 36 may output the second detection signal Sd2 using the motion conversion characteristic 40 (or 62) specified by a table or a function. In accordance with this feature, the second detection signal Sd2 indicative of the position of the control shaft 14 can be generated precisely from the motor position signal Spm.

[Second Embodiment]

Next, a controller 70 according to a second embodiment will be described with reference to FIG. 5. The same reference numerals are used to denote the same constituent elements as those of the controller 10 shown in the first embodiment, and description of such features may be omitted in certain cases.

<Configuration and Operations of Controller 70>

Figure 5:
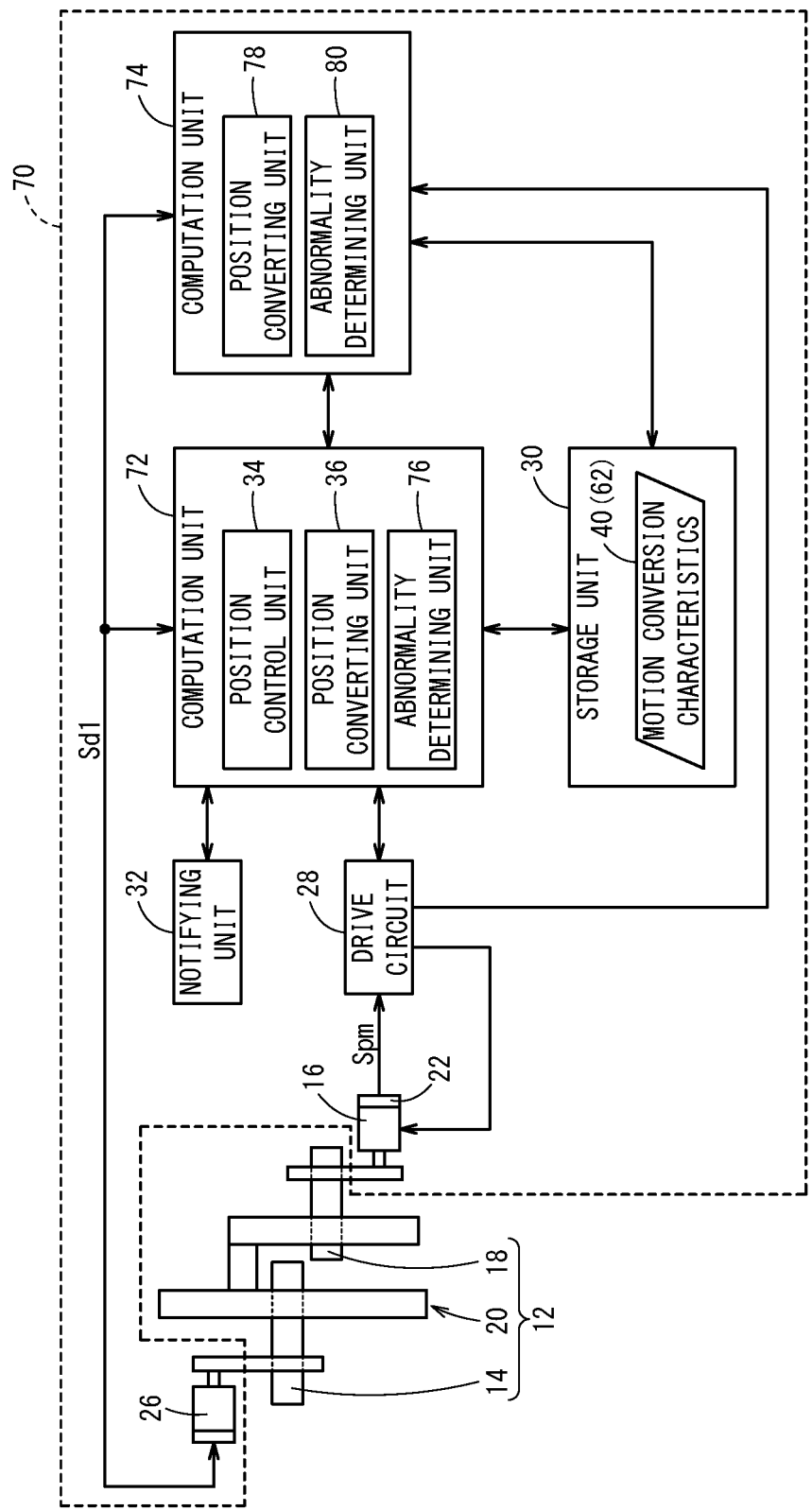
FIG. 5 is a block diagram of a controller according to a second embodiment of the present invention.

FIG. 5 is a block diagram of the controller 70 according to the second embodiment of the present invention. Similar to the first embodiment, the controller 70 is a device that controls a motor 16 for imparting motive power with respect to a control shaft 14 of a power transmission unit 12.

The controller 70 is constituted to include a motor 16, a pulse coder 22, a rotary encoder 26, a drive circuit 28, a storage unit 30, a notifying unit 32, and two computation units 72, 74 which are connected to each other.

The computation units 72, 74 are constituted by different processors, or by different cores of the same processor. By reading and executing a basic program stored in the storage unit 30, the one computation unit 72 is capable of realizing respective functions, including a position control unit 34, a position converting unit 36, and an abnormality determining unit 76. By reading and executing a basic program stored in the storage unit 30, the other computation unit 74 is capable of realizing respective functions, including at least a position converting unit 78 and an abnormality determining unit 80. As a result, it is possible to carry out double checking with even greater independence.

The position converting unit 78 includes a function equivalent to that of the position converting unit 36, and the abnormality determining units 76, 80 in principle include at least the same function as that of the abnormality determining unit 38 described in the first embodiment. Stated otherwise, the position converting unit 78 calculates the second detection signal Sd2 on the basis of the motor position signal Spm detected by the pulse coder 22. Further, using the first detection signal Sd1 detected by the rotary encoder 26, and the second detection signals Sd2 calculated by the position converting units 36, 78, the abnormality determining units 76, 80 of the computation units 72, 74 doubly determine whether the control shaft 14 is normal or abnormal.

Further, the abnormality determining unit 76 acquires from the other abnormality determining unit 80 the judgment result (whether normal or abnormal) of the abnormality determining unit 80, and determines whether or not its own judgment result and the judgment result of the abnormality determining unit 80 coincide with each other. In accordance with this feature, it can be determined whether or not the computation unit (computation unit 72, 74) on the side where either a normal state or an abnormal state is determined is operating normally or abnormally. In addition, in the case it is determined that the judgment results of the abnormality determining units 76, 80 do not coincide with each other, the abnormality determining unit 76 determines that there is an abnormality in at least one of the computation units 72, 74, and a notification to that effect is made to the operator through the notifying unit 32.

Moreover, the abnormality determining unit 76 may determine whether or not the velocities V1, V2, the positional deviations DP1, DP2, or the accelerations A1, A2 of the control shaft 14, which are calculated respectively by the abnormality determining units 76, 80, coincide with each other. In the event it is determined that the velocities V1, V2, the positional deviations DP1, DP2, or the accelerations A1, A2 do not coincide with each other, the abnormality determining unit 76 may determine that there is an abnormality in at least one of the computation units 72, 74, and a notification to that effect may be made to the operator. Further, although the abnormality determining unit 76 was used to determine whether or not there is an abnormality in at least one of the abnormality determining units 76, 80, the abnormality determining unit 80 may also be used to determine whether or not at least one of the abnormality determining units 76, 80 is operating abnormally. In this case, if an abnormality is determined to exist, the abnormality determining unit 80 issues a notification to that effect to the operator via the notifying unit 32.

<Effects of the Second Embodiment>

As has been described above, the controller 70 includes two computation units 72, 74. The computation unit 72 includes the position converting unit 36 and the abnormality determining unit 76, and the computation unit 74 includes the position converting unit 78 and the abnormality determining unit 80. In the case that the judgment results of the respective abnormality determining units 76, 80 of the two computation units 72, 74 do not coincide with each other, then at least one of the two computation units 72, 74, determines that at least one of the two computation units 72, 74 is abnormal (second abnormality determining step). In accordance with this feature, it can be determined whether or not the computation unit 72, 74 on the side where an abnormality of the control shaft 14 is determined is normal. Consequently, the reliability of the controller 70 in determining abnormalities is improved.

[Remarks]

The present invention is not limited to the embodiments described above, and it goes without saying that the embodiments can be freely modified within a range that does not deviate from the essence and gist of the present invention as set forth in the appended claims.

Alternatively, the respective configurations may be arbitrarily combined within a range in which no technical inconsistencies occur.

What is claimed is:

1. A controller configured to doubly check a state of a control shaft by applying motive power to the control shaft of a power transmission unit having an irregular speed characteristic, comprising:
   a motor configured to apply motive power to the control shaft;
   a position detecting unit configured to detect a position of the control shaft, and output a first detection signal indicative of the detected position;
   a motor position detecting unit configured to detect a position of the motor, and output a motor position signal indicative of the detected position;
   a position converting unit configured to output a second detection signal corresponding to the position of the control shaft, by forwardly converting the motor position signal output by the motor position detecting unit, using a motion conversion characteristic of the power transmission unit wherein the motion conversion characteristic is that the position of the motor and the position of the control shaft are not in proportional relation; and
   an abnormality determining unit configured to doubly determine whether or not the state of the control shaft is abnormal, using the first detection signal output from the position detecting unit, and the second detection signal output from the position converting unit,
   wherein the abnormality determining unit is configured to determine whether or not each of a first position of the control shaft on a basis of the first detection signal, and a second position of the control shaft on a basis of the second detection signal lies within a predetermined normal range.

2. The controller according to claim 1, wherein the position converting unit outputs the second detection signal using the motion conversion characteristic specified by a table or a function.

3. The controller according to claim 1, further comprising:
   two computation units;
   wherein each of the two computation units includes the position converting unit and the abnormality determining unit; and
   at least one of each of the two computation units determines that at least one of the two computation units is abnormal, in an event that judgment results of the abnormality determining units of each of the two computation units do not coincide with each other.

4. A controller configured to doubly check a state of a control shaft by applying motive power to the control shaft of a power transmission unit having an irregular speed characteristic, comprising:
   a motor configured to apply motive power to the control shaft;
   a position detecting unit configured to detect a position of the control shaft, and output a first detection signal indicative of the detected position;
   a motor position detecting unit configured to detect a position of the motor, and output a motor position signal indicative of the detected position;
   a position converting unit configured to output a second detection signal corresponding to the position of the control shaft, by forwardly converting the motor position signal output by the motor position detecting unit, using a motion conversion characteristic of the power transmission unit wherein the motion conversion characteristic is that the position of the motor and the position of the control shaft are not in proportional relation; and
   an abnormality determining unit configured to doubly determine whether or not the state of the control shaft is abnormal, using the first detection signal output from the position detecting unit, and the second detection signal output from the position converting unit
   wherein the abnormality determining unit is configured to calculate a velocity of the control shaft from each of the first detection signal and the second detection signal, and is configured to determine whether or not each of a first velocity calculated on a basis of the first detection signal, and a second velocity calculated on a basis of the second detection signal lies within a predetermined normal range.

5. The controller according to claim 4, wherein the position converting unit outputs the second detection signal using the motion conversion characteristic specified by a table or a function.

6. The controller according to claim 4, further comprising:
   two computation units;
   wherein each of the two computation units includes the position converting unit and the abnormality determining unit; and
   at least one of each of the two computation units determines that at least one of the two computation units is abnormal, in an event that judgment results of the abnormality determining units of each of the two computation units do not coincide with each other.

7. A controller configured to doubly check a state of a control shaft by applying motive power to the control shaft of a power transmission unit having an irregular speed characteristic, comprising:
   a motor configured to apply motive power to the control shaft;
   a position detecting unit configured to detect a position of the control shaft, and output a first detection signal indicative of the detected position;
   a motor position detecting unit configured to detect a position of the motor, and output a motor position signal indicative of the detected position;
   a position converting unit configured to output a second detection signal corresponding to the position of the control shaft, by forwardly converting the motor position signal output by the motor position detecting unit, using a motion conversion characteristic of the power transmission unit wherein the motion conversion characteristic is that the position of the motor and the position of the control shaft are not in proportional relation; and
   an abnormality determining unit configured to doubly determine whether or not the state of the control shaft is abnormal, using the first detection signal output from the position detecting unit, and the second detection signal output from the position converting unit,
   wherein the abnormality determining unit is configured to calculate an acceleration of the control shaft from each of the first detection signal and the second detection signal, and is configured to determine whether or not each of a first acceleration calculated on a basis of the first detection signal, and a second acceleration calculated on a basis of the second detection signal lies within a predetermined normal range.

8. The controller according to claim 7, wherein the position converting unit outputs the second detection signal using the motion conversion characteristic specified by a table or a function.

9. The controller according to claim 7, further comprising:
two computation units;
wherein each of the two computation units includes the position converting unit and the abnormality determining unit; and
at least one of each of the two computation units determines that at least one of the two computation units is abnormal, in an event that judgment results of the abnormality determining units of each of the two computation units do not coincide with each other.

10. A controller configured to doubly check a state of a control shaft by applying motive power to the control shaft of a power transmission unit having an irregular speed characteristic, comprising:
a motor configured to apply motive power to the control shaft;
a position detecting unit configured to detect a position of the control shaft, and output a first detection signal indicative of the detected position;
a motor position detecting unit configured to detect a position of the motor, and output a motor position signal indicative of the detected position;
a position converting unit configured to output a second detection signal corresponding to the position of the control shaft, by forwardly converting the motor position signal output by the motor position detecting unit, using a motion conversion characteristic of the power transmission unit wherein the motion conversion characteristic is that the position of the motor and the position of the control shaft are not in proportional relation; and
an abnormality determining unit configured to doubly determine whether or not the state of the control shaft is abnormal, using the first detection signal output from the position detecting unit, and the second detection signal output from the position converting unit,
wherein the abnormality determining unit calculates a positional deviation of the control shaft with respect to a command position of the control shaft from each of the first detection signal and the second detection signal, and is configured to determine whether or not each of a first positional deviation of the control shaft calculated on a basis of the first detection signal, and a second positional deviation of the control shaft calculated on a basis of the second detection signal lies within a predetermined normal range.

11. The controller according to claim 10, wherein the position converting unit outputs the second detection signal using the motion conversion characteristic specified by a table or a function.

12. The controller according to claim 10, further comprising:
two computation units;
wherein each of the two computation units includes the position converting unit and the abnormality determining unit; and
at least one of each of the two computation units determines that at least one of the two computation units is abnormal, in an event that judgment results of the abnormality determining units of each of the two computation units do not coincide with each other.

13. A control method in which a motor is used to apply motive power to a control shaft of a power transmission unit having an irregular speed characteristic, comprising:
a first outputting step in which a position detecting unit detects a position of the control shaft, and outputs a first detection signal indicative of the detected position;
a second outputting step in which a motor position detecting unit detects a position of the motor, and outputs a motor position signal indicative of the detected position;
a converting step of outputting a second detection signal corresponding to the position of the control shaft, by forwardly converting the output motor position signal, using a motion conversion characteristic of the power transmission unit wherein the motion conversion characteristic is that the position of the motor and the position of the control shaft are not in proportional relation; and
an abnormality determining step of doubly determining whether or not a state of the control shaft is abnormal, using the output first detection signal and the output second detection signal,
wherein the abnormality determining step determines whether or not each of a first position of the control shaft on a basis of the first detection signal, and a second position of the control shaft on a basis of the second detection signal lies within a predetermined normal range.

14. The control method according to claim 13, wherein the converting step outputs the second detection signal using the motion conversion characteristic specified by a table or a function.

15. The control method according to claim 13, wherein the converting step and the abnormality determining step are executed respectively by two computation units; and
further comprising a second abnormality determining step of determining that at least one from among the two computation units is abnormal, in an event that judgment results of the abnormality determining steps executed by each of the two computation units do not coincide with each other.

16. A control method in which a motor is used to apply motive power to a control shaft of a power transmission unit having an irregular speed characteristic, comprising:
a first outputting step in which a position detecting unit detects a position of the control shaft, and outputs a first detection signal indicative of the detected position;
a second outputting step in which a motor position detecting unit detects a position of the motor, and outputs a motor position signal indicative of the detected position;
a converting step of outputting a second detection signal corresponding to the position of the control shaft, by forwardly converting the output motor position signal, using a motion conversion characteristic of the power transmission unit wherein the motion conversion characteristic is that the position of the motor and the position of the control shaft are not in proportional relation; and
an abnormality determining step of doubly determining whether or not a state of the control shaft is abnormal, using the output first detection signal and the output second detection signal,
wherein the abnormality determining step calculates a velocity of the control shaft from each of the first detection signal and the second detection signal, and determines whether or not each of a first velocity calculated on a basis of the first detection signal, and a second velocity calculated on a basis of the second detection signal lies within a predetermined normal range.

17. A control method in which a motor is used to apply motive power to a control shaft of a power transmission unit having an irregular speed characteristic, comprising:
- a first outputting step in which a position detecting unit detects a position of the control shaft, and outputs a first detection signal indicative of the detected position;
- a second outputting step in which a motor position detecting unit detects a position of the motor, and outputs a motor position signal indicative of the detected position;
- a converting step of outputting a second detection signal corresponding to the position of the control shaft, by forwardly converting the output motor position signal, using a motion conversion characteristic of the power transmission unit wherein the motion conversion characteristic is that the position of the motor and the position of the control shaft are not in proportional relation; and
- an abnormality determining step of doubly determining whether or not a state of the control shaft is abnormal, using the output first detection signal and the output second detection signal,
- wherein the abnormality determining step calculates an acceleration of the control shaft from each of the first detection signal and the second detection signal, and determines whether or not each of a first acceleration calculated on a basis of the first detection signal, and a second acceleration calculated on a basis of the second detection signal lies within a predetermined normal range.

18. A control method in which a motor is used to apply motive power to a control shaft of a power transmission unit having an irregular speed characteristic, comprising:
- a first outputting step in which a position detecting unit detects a position of the control shaft, and outputs a first detection signal indicative of the detected position;
- a second outputting step in which a motor position detecting unit detects a position of the motor, and outputs a motor position signal indicative of the detected position;
- a converting step of outputting a second detection signal corresponding to the position of the control shaft, by forwardly converting the output motor position signal, using a motion conversion characteristic of the power transmission unit wherein the motion conversion characteristic is that the position of the motor and the position of the control shaft are not in proportional relation; and
- an abnormality determining step of doubly determining whether or not a state of the control shaft is abnormal, using the output first detection signal and the output second detection signal,
- wherein the abnormality determining step calculates a positional deviation of the control shaft with respect to a command position of the control shaft from each of the first detection signal and the second detection signal, and determines whether or not each of a first positional deviation of the control shaft calculated on a basis of the first detection signal, and a second positional deviation of the control shaft calculated on a basis of the second detection signal lies within a predetermined normal range.

* * * * *